(12) United States Patent
Paschke et al.

(10) Patent No.: US 6,179,312 B1
(45) Date of Patent: Jan. 30, 2001

(54) RETRACTABLE STAIRWAY FOR ENTERING AND EXITING A VEHICLE

(75) Inventors: Joachim Paschke, Gechingen (DE); Michael von Mayenburg, Lake Oswego, OR (US); Louis A. Novoa; Ducan Good, both of Portland, OR (US); Charles H. Blakewood, Vancouver, WA (US); Mark S. Hurayt, Aloha, OR (US)

(73) Assignee: Freightliner LLC, Portland, OR (US)

( * ) Notice: Under 35 U.S.C. 154(b), the term of this patent shall be extended for 0 days.

(21) Appl. No.: 08/818,806

(22) Filed: Mar. 14, 1997

(51) Int. Cl.$^7$ ........................................................ B60R 3/02
(52) U.S. Cl. .......................... 280/166; 105/444; 105/447; 182/18; 182/88; 182/127
(58) Field of Search ..................................... 280/163, 166, 280/169, 164.1; 150/443, 444, 445, 447, 449, 450; 182/88, 18, 127, 84

(56) References Cited

U.S. PATENT DOCUMENTS

| | | |
|---|---|---|
| 1,621,479 | 3/1927 | Cleveland et al. . |
| 3,224,525 | 12/1965 | Froitzheim et al. . |
| 3,378,278 | 4/1968 | Froitzheim et al. . |
| 3,392,990 | 7/1968 | Wolf . |
| 3,403,926 | 10/1968 | Way et al. . |
| 3,572,754 | 3/1971 | Fowler . |
| 3,696,372 | 10/1972 | Garrett et al. ........................ 182/18 |
| 3,865,399 | 2/1975 | Way . |
| 3,955,827 | 5/1976 | Wonigar . |
| 3,967,695 | * 7/1976 | Waddell ............................ 280/166 X |
| 4,074,786 | 2/1978 | Joubert . |
| 4,116,457 | 9/1978 | Nerem et al. . |
| 4,140,327 | 2/1979 | Hackney, III . |
| 4,200,303 | 4/1980 | Kelly . |
| 4,416,486 | 11/1983 | McNaught et al. . |
| 4,482,113 | * 11/1984 | Backlund et al. ............... 280/166 X |
| 4,570,962 | 2/1986 | Chavira . |
| 5,085,450 | 2/1992 | DeHart, Sr. . |
| 5,228,707 | 7/1993 | Yoder . |
| 5,241,780 | * 9/1993 | Zaun et al. ..................... 280/164.1 X |
| 5,284,349 | 2/1994 | Bruns et al. . |
| 5,375,864 | 12/1994 | McDaniel . |
| 5,538,265 | 7/1996 | Chen et al. .......................... 280/163 |
| 5,547,040 | * 8/1996 | Hanser et al. ................... 280/166 X |
| 5,584,493 | 12/1996 | Demski et al. ....................... 280/166 |

FOREIGN PATENT DOCUMENTS

| | | |
|---|---|---|
| 3826542 A1 | 8/1988 | (DE) . |
| 3826542A1 | 2/1990 | (DE) . |
| 3826542 | * 2/1990 | (DE) .................................... 280/166 |
| 3920527 | * 7/1990 | (DE) .................................... 280/166 |
| 0012336A1 | 6/1980 | (EP) . |
| 2 457 791 | 5/1980 | (FR) . |
| 2457791 | 12/1980 | (FR) . |
| 60-48741 | 6/1985 | (JP) . |
| 08332900 | 12/1996 | (JP) . |

\* cited by examiner

*Primary Examiner*—Michael Mar
(74) *Attorney, Agent, or Firm*—Klarquist Sparkman Campbell Leigh & Whinston, LLP

(57) ABSTRACT

A retractable stairway assembly for entering and exiting a vehicle with a cab has a stairway with steps. The stairway assembly is movable between a retracted position, in which the stairway is beneath the cab, and an extended position, in which the stairway is exposed to allow entering and exiting of the vehicle. The stairway assembly also has a panel that substantially hides the stairway when in the retracted position. An actuator moves the stairway assembly between the retracted and extended positions in response to closing and opening the door.

19 Claims, 6 Drawing Sheets

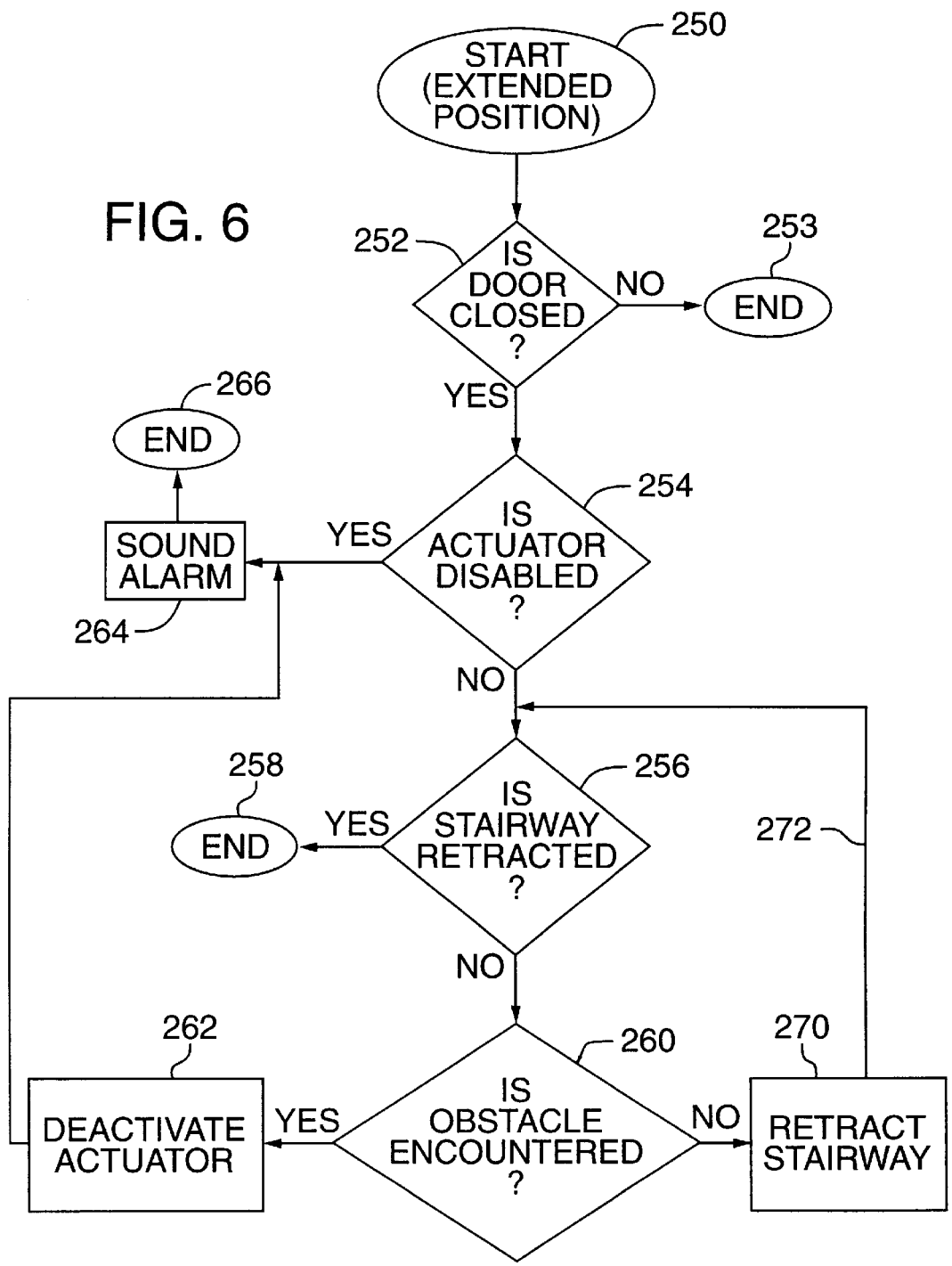

RETRACTABLE STAIRWAY FOR ENTERING AND EXITING A VEHICLE

FIELD OF THE INVENTION

This invention relates to a retractable stairway assembly for entering and exiting a vehicle, in particular a truck, and to vehicles with such retractable stairway assemblies.

BACKGROUND OF THE INVENTION

The design of many large vehicles, in particular cab-over-engine trucks, does not allow easy access into the cab of the vehicle. Often, the cab is positioned at a substantial height from the ground, making it nearly impossible for a passenger to just "step up" into the cab from the ground and requiring the passenger to jump out of the cab to the ground. This positioning makes access to and from the cab somewhat hazardous. Therefore, steps or some other type of foot support structure are necessary to allow a passenger to climb up into the cab and walk out of the cab. However, there is often little space available beneath the door to the cab for providing steps or the like because the door often is positioned almost directly above a forward wheel the truck.

Also, steps or the like that protrude from the side of the vehicle are unsatisfactory from an aerodynamic standpoint because they likely will decrease fuel mileage and increase emissions. Therefore, a need exists for a stairway that provides comfortable and safe access to and from the cab, while having reasonable aerodynamic characteristics.

SUMMARY OF THE INVENTION

Accordingly, it is an object of the present invention to provide a retractable stairway assembly for entering and exiting a vehicle.

In accordance with the one aspect of the present invention, a retractable stairway assembly is coupled to a back face of a panel and includes a stairway having a plurality of steps with step surfaces. The stairway and panel are movable between a retracted position, in which the panel is aligned with a side portion of the vehicle and the stairway is behind the panel and the step surfaces face upwardly, and at least one extended position, in which the stairway is exposed to allow entering and exiting of the vehicle.

As another aspect of this invention, the assembly may include an actuator coupled to the stairway and operable to move the stairway between that retracted and extended positions.

As yet another aspect of this invention, the assembly may include a door position sensor and a stairway position controller operable in response to the door position sensor to cause the stairway to shift from the retracted position to an extended position upon opening the door and from the extended position to the retracted position upon closing the door.

As still another aspect of the invention, the assembly may include a stairway movement deactivator to block the movement of the stairway between the retracted and extended positions. More specifically, the deactivator may include a sensor operable to detect the presence of a person on the stairway or an obstacle in the movement path of the stairway and to block the retraction or extension of the stairway in response thereto.

As a further aspect of this invention, the vehicle has a side portion including a front quarter fender and a rear quarter fender that together define a wheel well, and the assembly forms at least a portion of the wheel quarter fender.

As yet another aspect of this invention, the panel and stairway may be pivotably mounted to the vehicle about an upright axis.

As still another aspect of this invention, the panel has at least one foot receiving opening adjacent one of the step surfaces to expose at least a portion of the adjacent step surface. As a result, a foot may be positioned through the foot receiving opening and onto the step to facilitate access to the cab when the stairway and panel are in the retracted position.

The present invention is directed toward the above objects, advantages, and features individually, as well as collectively. These and other objects, features, and advantages of the present invention will become more apparent with reference to the following description and figures.

BRIEF DESCRIPTION OF THE DRAWING

FIG. 6 is a block diagram showing an operating logic for the stairway assembly during retraction thereof.

DETAILED DESCRIPTION OF A PREFERRED EMBODIMENT

Figure 1:
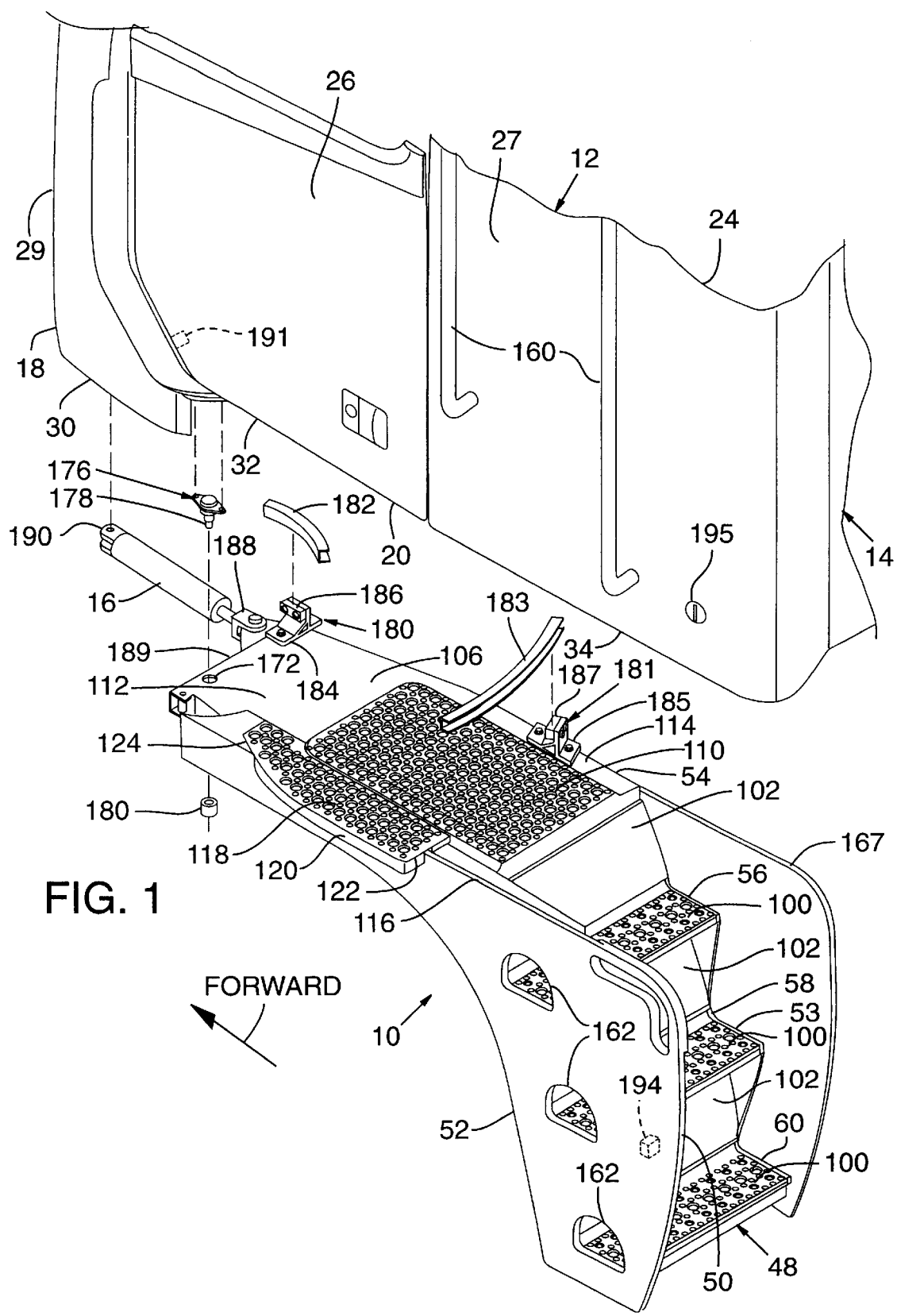
FIG. 1 is an exploded, perspective view of a retractable stairway assembly of one embodiment of the invention, shown adjacent a truck cab.
Figure 2:
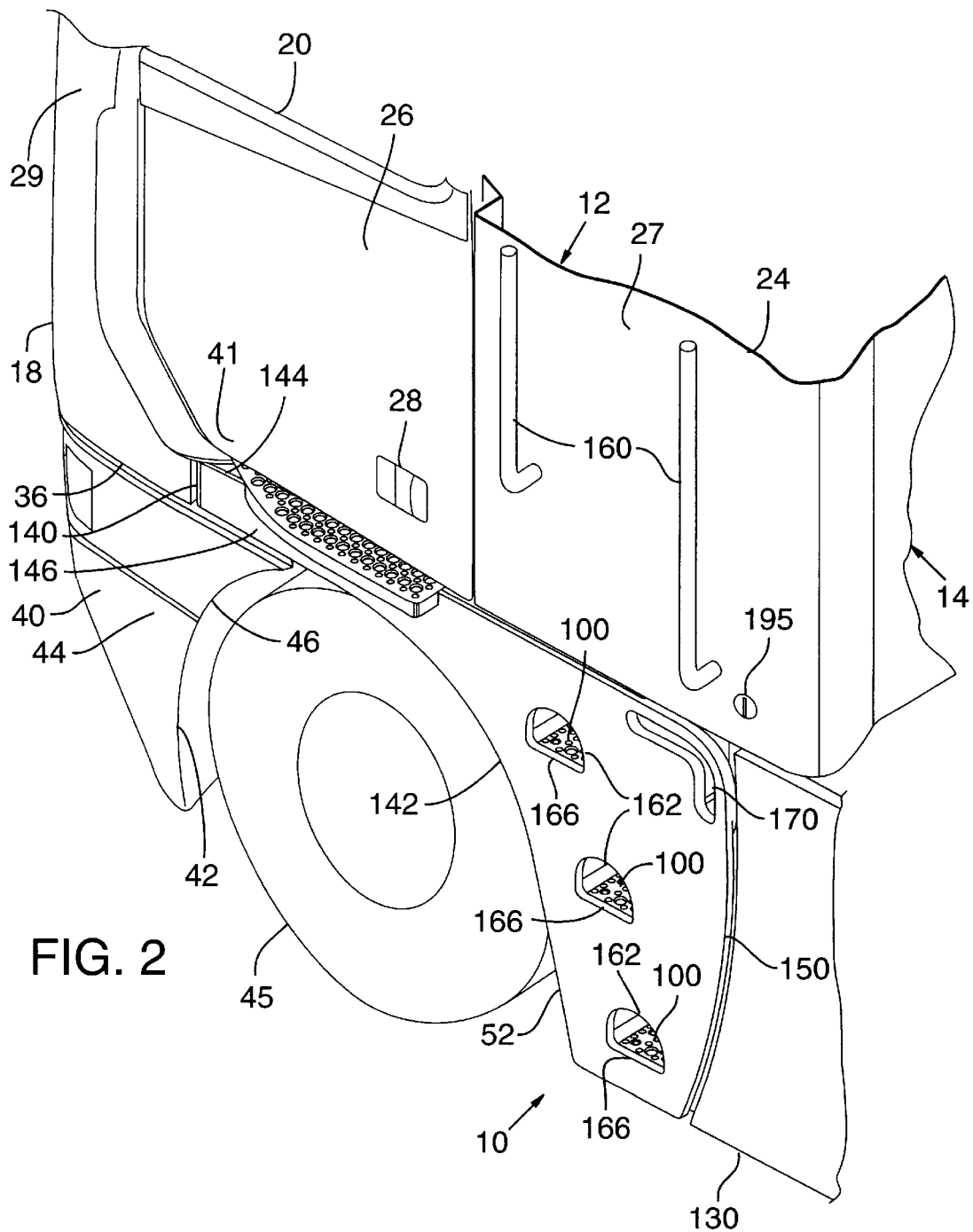
FIG. 2 is a perspective view of a portion of the truck, the retractable stairway assembly of FIG. 1 shown in a retracted position, and a door to the cab shown in a closed position.
Figure 3:
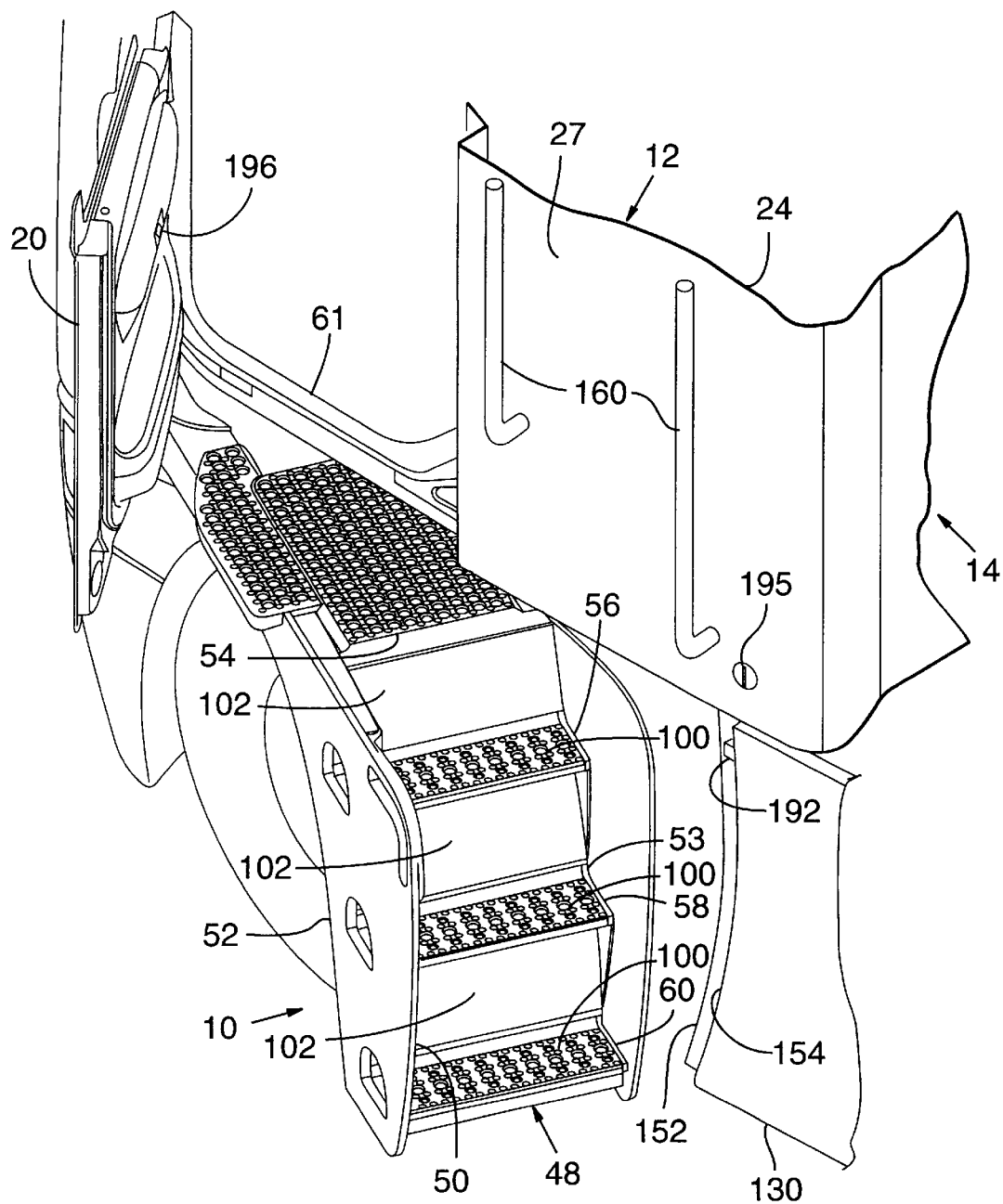
FIG. 3 is a perspective view like that of FIG. 2 showing the retractable stairway assembly in an extended position and the door in an open position.

One form of a retractable stairway assembly in accordance with the present invention is shown in FIGS. 1–3. As indicated in these figures, the stairway assembly 10 may be attached to a cab 12 of a truck 14, but could also be attached to the frame of the truck. When attached to the cab of a conventional cab over engine truck, the stairway assembly may be lifted with the cab when the engine is being serviced.

Usually, the stairway assembly 10 is stored underneath the cab 12 in a retracted position, as shown in FIG. 2, but the stairway assembly 10 is movable into extended positions, in which the stairway assembly 10 is exposed, as shown in FIG. 3, to allow a truck passenger to enter or exit the cab 12 by ascending or descending the stairway assembly.

In the illustrated embodiment, the stairway assembly 10 includes an actuator 16 that is operable to automatically shift the stairway assembly 10 from the retracted position to the extended position when a door 20 to the cab 12 is opened. The actuator 16 is also operable to automatically shift the stairway assembly from the extended to retracted position when the door is closed. This automatic operation, in the illustrated embodiment occurs unless other predetermined conditions exist, as will be explained in greater detail later.

Alternatively, the stairway assembly 10 could be manually operated, for example by a user simply moving the assembly manually to an open or closed position. As another manual approach, a mechanical linkage (not shown) may be connected between the stairway assembly 10 and the door 20 to transmit the motion of opening or closing the door 20 to the stairway assembly 10. Although these other approaches may be used, in the description which follows the preferred automatic operation is described.

As illustrated best in FIG. 2, the cab 12 of the truck 14 has a forward body portion 18 spaced longitudinally along the truck from a side body panel portion 24. The door 20 spans the space between the forward body portion 18 and the side body panel portion 24 and is pivotable between a closed position, as shown in FIG. 2, and an open position, as shown in FIG. 3. Although a stairwell which pivots between open and closed positions is preferred, other mounting approaches, for example, sliding or other mechanisms may be used to couple the stairway assembly to the cab.

The door 20 has an exterior side surface 26 with a door handle 28 recessed in its lower, right-hand corner, as shown in FIG. 2. The exterior side 26 of the door 20 is substantially aligned with the exterior side surface 27 of the side panel 24 and the exterior side surface 29 of the forward body portion 18 adjacent the door 20, when the door is in the closed position. For purposes of this description, the term "substantially aligned" is meant to encompass situations in which a surface is configured to aesthetically match the contours of the vehicle. Thus, perfect or flush alignment is not required, nor are planar surfaces although a situation where a self contained stairwell is simply mounted to a vehicle surface, as opposed to being built in so as to recess at least partially into the surface, is excluded from this definition.

As shown best in FIG. 1, the forward body portion 18 of the truck 14 has a lower extension 30 that protrudes downwardly past the bottom edge 32 of the door 20 and the bottom edge 34 of the side panel 24.

As shown in FIG. 2, the truck 14 also includes a bumper 40 beneath the bottom edge 36 of the extension 30 and the forward portion 41 of the door 20. The exterior face 44 of the bumper 40 is substantially aligned with the exterior side surface 29 of the forward body portion 18 of the truck 14. The rearward edge 42 of the bumper 40 is concavely, arcuately-shaped and generally mimics the shape of a forward wheel 45 adjacent thereto. The rearward edge 42 of the bumper 40, together with the stairway assembly 10, define a forward wheel well 46, as will be discussed in greater detail below.

The stairway assembly 10 includes a stairway 48 (FIG. 1) protruding in a perpendicular direction from the back face 50 of an upright panel 52. The illustrated stairway includes a stairway frame 53 supporting an elongated, top platform 54 and in this case three steps: a top step 56, a middle step 58, and a bottom step 60, as shown in FIGS. 1 and 3.

For ease of description, the parts of the stairway assembly 10 are described in locational terms, such as "forward," "rearward," "inboard," etc., as the parts are positioned in FIG. 1 relative to the truck 14.

Figure 4:
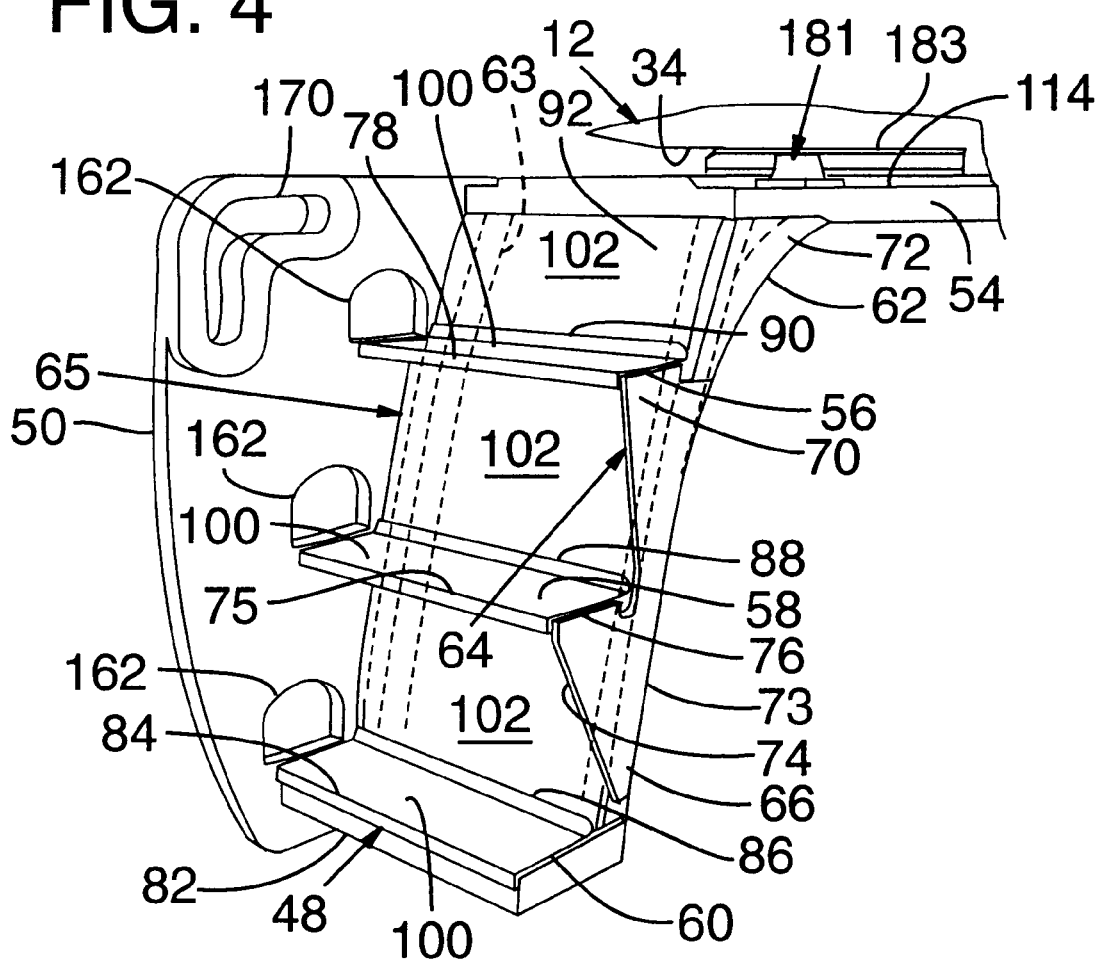
FIG. 4 is a rear perspective view of the stairway assembly of FIG. 1, shown without a splash guard and mounted to the truck.

As indicated in FIG. 4, the illustrated stairway frame 53 has two frame rails 62, 63, in this case square extrusions, one on each side of the stairway. The frame rails 62, 63 are arcuate and are upwardly extending to help define a portion of the wheel well 46 and preferably form a rear quarter fender. The frame 53 also includes an inboard gusset assembly 64 mounted, such as by bolting, to the inboard frame element 62 and an outboard gusset assembly 65 mounted similarly to the outboard frame element 63. Both the inboard and outboard gusset assemblies 64, 65 may be made of a thin, durable material such as commonly used in truck exterior components, with aluminum, fiberglass, plastic, or steel being exemplary materials. Each of the gusset assemblies 64, 65 is similarly shaped and constructed. Therefore, only the inboard gusset assembly 64 is described.

The inboard gusset assembly 64 has a combined bottom gusset 66 and middle gusset 70, and a separate top gusset 72. The bottom gusset 66 is essentially triangular, with one side 73 extending from just above the bottom step 60 along the edge of the inboard frame element 62 to the middle step 58. The outward side 74 of the bottom gusset 66 extends from just above the bottom step 60 diagonally outward from the inboard frame element 62 to the outward edge 75 of the middle step 58, and the top side 76 of the bottom gusset 66 extends along the middle step 58. The middle gusset 70 is shaped similarly to the bottom gusset 68 but extends from just above the middle step 58 to the outward edge 78 of the top step 56. The bottom and middle gussets 68, 70 provide support and mounting locations for the middle and top steps 58, 56, respectively. As will be described below, the bottom step 60 is supported by a rectangular bottom step frame 82 mounted to the bottom of frame elements 62, 63.

The top gusset 72 is also somewhat triangular, with one of its edges following the curvature of the inboard extrusion 62 between the top platform 54 and a location near the top step 56. The top gusset 72 provides support to the stairway assembly, which is cantilevered from the top platform 54.

The steps 56, 58, 60 are formed by mounting treads 100, or step surfaces, to the bottom step frame 82 and the top sides 76 of the bottom and middle gussets 66, 70. Preferably, the top sides 76 of the gussets 66, 70 have tabs (not shown) that extend underneath the treads 100 for facilitating the mounting of the treads thereon. The outward edges 75, 78, 84 of the treads 100 are curved downwardly, and the inward edges 86, 88, 90 of the treads are curved upwardly to increase the rigidity of the treads.

The steps 56, 58, 60 ascend along the panel 52 beginning with the bottom step 60 adjacent the rearward, bottom corner of the panel, and ending with the top platform 54 adjacent the opposite corner of the panel so that the top platform is appropriately positioned relative to the door opening 61 when the stairway assembly 10 is in the extended position.

Preferably, a wheel well defining member, such as a sheet 92 of glass reinforced polyester or other suitable material, extends the width of the steps 56, 58, 60 and is mounted to the frame elements 62, 63 behind the steps. In the illustrated embodiment, the sheet 92 does not provide rigidity to the stairway frame. The sheet 92 defines the wall of the rear fender well and prevents mud or the like from splashing up on the steps. The sheet 92 is preferably covered on its back with an indoor/outdoor carpet (not shown), such as artificial grass, to further inhibit splashing of water from the wheel well.

The top platform 54 is substantially rectangular and is supported by the frame, and more particularly by four box beams along the perimeter edges of the platform with a plurality of stringers or cross pieces (e.g. three equally spaced box beam braces) therebetween. Thus, each box beam extends along a side of the perimeter of the top platform. A top plate 106 and a bottom plate 108 (FIG. 4) are fastened to the tops and bottoms, respectively, of the box beams 104. The top plate 106 has a tread 110 formed in a substantial portion thereof. A forward area 112 of the top plate 106 and a narrow strip area 114 along the inboard side of the top plate 106 are left smooth to facilitate mounting hardware thereon, which will be discussed in greater detail later, and to provide an enclosed area at those locations so that, if necessary, electronics and operating mechanisms can be stored between the top and bottom plates in these areas.

Protruding from the outboard side 116 of the top platform 54 is an outboard step 118. The outboard step 118 is approximately centered about a center transverse line of the top platform 54 and has a slightly, curved outboard edge 120 that tapers from the rear side 122 of the step 118 to the forward side 124 so as to minimize drag caused by the step 118. The step 118 protrudes past the exterior surfaces 27, 29 of the truck 14, as shown in FIG. 2, to provide a stepping surface when the stairway 48 is in the retracted position.

The panel 52 is fastened to the outboard side of the stairway 48. The illustrated panel 52 is essentially planar and, when in the retracted position, spans the area between the wheel well 46 and a lower side body portion 130 of the truck 14, as shown in FIG. 2. The panel 52 is shaped to bound and define a portion of the wheel well 46. More specifically, the panel 52 has a forward edge 140 with an arcuate cut-out 142 (FIG. 2) that, in the illustrated embodiment, begins a small distance below the top edge 144 of the panel 52 and extends over half the length of the panel, thus defining an elongated, narrow band 146 at the top, forward side of the panel. The panel 52 also has a slightly curved rearward edge 150 that, when the stairway assembly 10 is moved into the retracted position, overlaps and is stopped by a ledge 152 extending behind and parallel to the forward edge 154 of the lower side body portion 130 of the truck 14, as shown in FIG. 3. The panel 52 is preferably made from a durable material such as fiberglass, plastic, aluminum, or steel. One example of a suitable material is glass reinforced unsaturated polyester composite.

In the retracted position as shown in FIG. 2, the panel 52 hides the steps 56, 58, 60 from view. When in this concealed position, the steps are beneath the cab 12. Also, in this position, the panel 52 is nearly flush, or substantially aligned, with adjacent surfaces on the truck 14, including the exterior surfaces of the door 20, of the side panel 24, and of the extension 30. Thus, the stairway 48 does not detract from the sleek appearance of the truck 14 or, in the illustrated form, protrude into the air flow path over the side of the truck. In the retracted position, as indicated in FIG. 1, the steps 56, 58, 60 and platform 54 extend perpendicularly inward from the side of the truck 14, with the bottom step 60 being the most rearward and the top platform 54 being the most forward relative to the front and back of the truck 14.

In the extended position, as shown in FIG. 3, the stairway 48 is positioned so that a passenger can conveniently walk up the stairway 48 to the level of the cab 12. Thus, the stairway assembly 10 of the present invention eliminates the need for passengers to use their hands to climb into the cab 12. Nevertheless, handrails 160 are provided on the side body fairing 24 for safety reasons.

More specifically, when the stairway assembly 10 is in the extended position, the bottom step 60 is positioned furthest away from the truck and the steps 56, 58, 60 ascend to the top platform 54, which is just beneath the door opening 61, providing safe and easy access to and from the cab.

The panel 52 also is provided with three foot receiving openings 162 that allow access to and from the cab 12 for passengers desiring to enter or exit the cab 12 while the stairway 48 is in the retracted position. For instance, when the stairway is maintained in a retracted position because there is insufficient clearance between the side of the truck 14 and an adjacent object. Each illustrated opening 162 is "D"-shaped with the linear portion of the "D" forming a bottom edge 166 beneath the opening. As shown in FIG. 2, each bottom edge 166 is aligned with the top of a tread 100, and the openings 162 are sized to accommodate a booted foot. Thus, a user can step into the openings 162 with their foot reaching the tread 100 to climb into or out of the cab 12 when the stairway 48 is in the retracted position. Because the openings 162 are adjacent the steps 56, 58, 60, when the panel 52 is viewed in the retracted position, the openings follow the same arcuate path as the wheel well 46, providing an aesthetically pleasing appearance.

The panel 52 optionally is provided with a handle or a handhole 170 (FIG. 3), shown in the upper right corner of the panel, for assisting a passenger who enters or exits the cab 12 using the openings 162 or for assisting to manually open or close the stairway assembly 10.

The stairway assembly 10 optionally includes an inboard splash guard 167 mounted to the inboard square extension 62. The splash guard 167 is the same shape as the panel 52 but has a slightly smaller outline to allow the splash guard 167 to swing past the ledge 152 against which the panel 52 rests.

The stairway assembly 10 is coupled to the truck 14. In the illustrated approach, the stairway assembly 10 is pivotally mounted to a frame member (not shown) of the truck 14. As can be seen in FIG. 1, a pivot receiving hole 172 is provided at the outboard, forward corner of the top platform 54. A pivot 176 having a pivot pin 178 is bolted or otherwise fastened to the frame member so that the pivot pin 178 extends through the hole 172. The pivot pin is held in place with fastener 180. This mounting allows the stairway assembly 10 to pivot between the retracted and extended positions about an upright, preferably vertical, axis, coinciding with the longitudinal axis of the pivot pin 178.

The stairway assembly 10 is also connected to the truck 14 by a first and second slides 180, 181 and accompanying first and second guide tracks 182, 183, as indicated in FIG. 1. The first slide 180 is mounted at the forward, inboard corner of the top platform 54. The second slide 181 is mounted near the middle of the narrow strip area 114 of the top platform 54. The first and second slides 180, 181 each include a respective support bracket 184, 185, which is bolted to the top platform 54, and a respective slide block 186, 187 mounted to the support bracket 184, 185, preferably by bolting.

The first and second guide tracks 182, 183 are mounted to frame members (not shown) of the truck 14 in position to slidably receive the blocks 186, 187. The guide tracks 182, 183 are each arcuate and have a "C"-shaped cross-section. The radii of the bends of the guide tracks 182, 183 are readily determined by geometry. The guide tracks are typically of a durable material such as steel. The blocks 186, 187 of the slides 180, 181 slidably fit within the openings of the guide tracks 182, 183 and slide therein. Thus, the guide tracks 182, 183 and slides 180, 181 provide support to the stairway assembly 10 while allowing the stairway assembly to pivot between the retracted and extended positions. To facilitate this movement, the slides 180, 181 preferably are made from a friction reducing material, such as ultra-high molecular weight polyethylene, although other materials or slide structures may be used instead.

The illustrated cylinder actuator 16 is mounted at its rearward end 188 to a bracket at the inboard corner of the forward edge 189 of the stairway assembly 10 at a location spaced from the pivot 178, or could be mounted directly thereto. The forward end 190 of the actuator 16 is mounted to a frame member (not shown) of the truck 14, as indicated in FIG. 1. The actuator 16 is preferably a fluid cylinder such as a hydraulic cylinder or an air cylinder, but may alternatively be an electric motor or other suitable movement generating device.

In the illustrated FIG. 1 embodiment, when the stairway assembly 10 is retracted, the actuator 16 is also retracted. As the actuator 16 is extended, it exerts a force against the forward, inboard corner of the top platform 54, causing the stairway assembly 10 to pivot about the axis of pivot pin 178 in a clockwise direction from the retracted to the extended position. The illustrated embodiment shows the extended position at about a 45° angle from the side of the truck 14; however, other angles could be achieved, for example by using a cylinder having a different length stroke, a different type actuator, or using control signals sent by sensors to stop the stairway 48 upon the happening of some contingency, such as will be discussed later.

To move the stairway assembly 10 from the extended to the retracted position, the actuator 16 is retracted, exerting a pulling force on the forward, inboard corner of the platform 54, which causes the stairway assembly 10 to pivot counterclockwise in FIG. 1 from the extended to the retracted position. Alternatively, the retraction force may be applied by a spring. As previously discussed, the retracted position of the illustrated embodiment is defined by the ledge 152 on the lower side body portion 130.

In the illustrated embodiment, the extension and retraction of the stairway 48 is automatically controlled by a control assembly. The control assembly may include a microprocessor for processing input signals from sensors and switches to control the actuator, as described more fully below. Alternatively, the control assembly may include sensors and switches that are hard-wired to operate the stairway system. Either way, the control assembly may operate in accordance with the logic shown in the flowcharts in FIGS. 5 and 6. The decision blocks represent determinations by a microprocessor or the logic of the hard-wired circuit.

More specifically, in the illustrated embodiment, the sensors include a door position sensor 191 (FIG. 1) for sensing if the door 20 is open, a stairway position sensor 192 (FIG. 3) for sensing if the stairway is retracted, and an extension and retraction limiter sensor 194 (or sensors) (FIG. 1) for sensing obstacles to the movement of the stairway. The sensors 191, 192, 194 may be of any type known in the industry for achieving the stated purposes. For instance, the stairway position sensor 191 and the door position sensors 192 may be microswitches and the limiters 194 may be strain gauges for detecting strain on the stairway in the event the stairway encounters obstacles during opening or closing, optical sensors for checking if the pathway for the stairway 48 is clear, or other suitable sensors.

In addition, the stairway assembly 10 optionally includes an occupant sensor for sensing the presence of a person or other object on the stairway. The occupant sensor may be, for example, a mechanical interlock having teeth for engaging a slot when the sag on the stairway assembly 10 attained a certain predetermined amount. The engagement of the teeth in the slot would prevent movement of the stairway assembly 10.

The circuit may also include a remote control switch 195, such as a key-operated switch, for activating the stairway 48 to extend or retract or to deactivate the stairway assembly 10 regardless of the door position. In addition, the remote control switch 195 may be mounted remote from the door 20 at a lower portion of the side panel 24 of the cab 12. Also, another deactivation switch 196, such as a interdiction switch as shown in FIG. 3, is mounted preferably to the interior of the door 20 so that a person inside the truck 14 can deactivate the system to prevent the stairway 48 from opening. The remote control deactivation switches 195, 196 are particularly useful in situations where there is not enough clearance between the truck 14 and an adjacent object, such as another parked vehicle or a tree, to extend the stairway 48. Also, the remote control switch 195 allows a user to cause the stairway to open with the user in position to climb the stairway 48 without the door 20 being opened.

Figure 5:
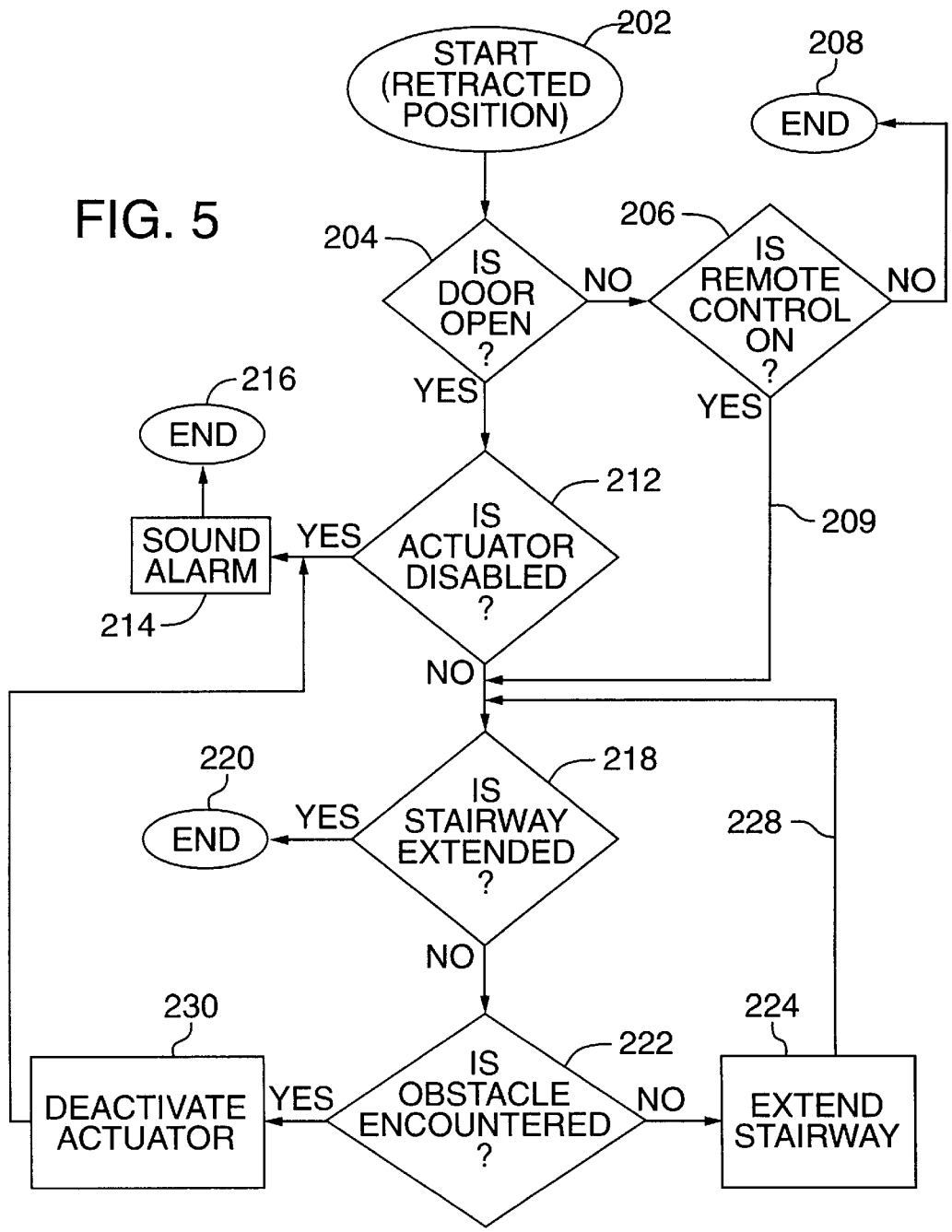
FIG. 5 is a block diagram showing an operating logic for the stairway assembly during extension thereof.

As shown in FIG. 5, the control assembly operates to extend the stairway 48 as follows. Starting at block 202 with the stairway 48 in the retracted position, the microcontroller monitors the door position sensor to see whether the door 20 is open, as represented by decision block 204. If the door 20 is not open, the microcontroller monitors the remote control switch 195, as represented by decision block 206. If the remote control switch 195 is not activated, no action occurs, as represented by block 208. If the remote control switch 195 is activated, then the microprocessor continues to block 218, as indicated by line 209.

If the door 20 is open, the microprocessor checks the actuator 16 to see if it is disabled, as represented by decision block 212. The actuator 16 could be disabled, for example, by the deactivation switch 196 or the remote control switch 195. If the actuator 16 is disabled when the door is open, then an alarm is sounded, as represented by block 214 to alert passengers that the door 20 is open but the stairway 48 is not extended so that they are not injured by exiting the cab 12 assuming the stairway 48 to be in the extended position. No further action occurs, as indicated by block 216.

However, if the actuator 16 is not disabled, then the microprocessor checks the stairway position sensor to see if the stairway 48 is extended, as represented by decision block 218. If the stairway 48 is extended, then no action occurs, as represented by block 220.

If the stairway 48 is not extended, then the microprocessor checks to see if the limiter sensor 194 has sensed an encounter with an obstacle. This is done to determine if the stairway 48 has impacted an object, as represented by decision block 222. If no object is encountered, then the actuator 16 is activated to move the stairway 48 into the extended position, as indicated by block 224. The process of monitoring the extension of the stairway 48 continues again at decision block 218, as indicated by line 228. When the stairway is fully extended, block 220 is reached and the operation stops.

If, however, the stairway 48 has encountered an object, as determined at block 222 the actuator is deactivated, as indicated at block 230, and the alarm is sounded, as indicated at block 214. No further action occurs, as indicated at block 216.

As indicated in FIG. 6, the control assembly operates to retract the stairway 48 as follows. Starting at block 250 with the stairway 48 in the extended position, the microcontroller monitors the door position sensor to check whether the door 20 is closed or the switch 195 is in the retract position, as represented by decision block 252. If the door 20 is not closed or switch 195 is not in the retract position, no further action occurs, as indicated by block 253. If the door 20 is closed, or the switch 195 is in the retract position, the microprocessor checks to see if the actuator 16 is disabled, as represented by decision block 254. If the actuator is not disabled, the microcontroller checks the stairway position sensor to see if the stairway 48 is retracted, as represented by decision block 256. If the stairway 48 is retracted, the retraction process is complete and no further action occurs, as indicated by terminator block 258.

If at block 256 the stairway 48 is found not retracted, the microprocessor checks the limiter sensor 194 to see if an obstacle is encountered, as represented by decision block 260.

If an obstacle is encountered, the actuator 16 is deactivated as indicated in block 262 and the alarm is sounded as indicated in block 264. No further action occurs as indicated in block 266.

If, however, no obstacle is encountered, the actuator 16 is activated to retract the stairway 48 as indicated in block 270.

Then, the process continues again at decision block 256, as indicated by line 272, until the stairway is fully retracted as determined at block 256.

As is evident from the foregoing description, the stairway assembly of the present invention permits comfortable and safe entry to and exiting from the cab.

This description illustrates one embodiment of the present invention and should not be construed to limit the scope of the invention in any way. Other modifications and variations may be made to the assembly described without departing from the invention as defined by the appended claims and their equivalents.

For instance, although this invention was specifically described with reference to cab-over-engine trucks, this invention could be used in other vehicles having poor accessibility to their interiors.

The invention claimed is:

1. A retractable stairway assembly for a vehicle having a cab, a door to the cab, the door having a lower edge and a side portion adjacent the cab, the assembly comprising:
 a panel having a front face and a back face;
 a stairway comprising a plurality of steps with step surfaces coupled to the panel and projecting in a direction way from the back face of the panel;
 the stairway and panel being movable between a retracted position, in which the panel is substantially aligned with the side portion and the stairway is behind the panel with the step surfaces facing upwardly and at least one extended position, in which the stairway is exposed to allow ingress and egress from the cab; and
 a top step supported by the stairway and having a projecting portion which extends outwardly beyond the lower edge of the door when the stairway is in the retracted position and the door is closed, the top step being movable with the stairway as the stairway is moved between the extended and retracted positions.

2. The assembly of claim 1 in which the door has at least one open position and a closed position, the panel and stairway being pivotally mounted to the vehicle so as to pivot about an upright stairway pivot axis as the stairway and panel move between the retraced and the extended positions, and in which the assembly further comprises an actuator coupled to the stairway at a location spaced from the stairway pivot axis and operable to move the stairway between the retracted and extended positions upon actuation of the actuator.

3. The assembly of claim 2 including a door position sensor, and a stairway position controller operable in response to the door position sensor to cause the actuator to shift the stairway from the retracted position to an extended position upon opening the door and from an extended position to the retracted position upon closing the door, a stairway movement deactivator operable to selectively block the movement of the stairway between the retracted and extended positions, and in which the deactivator comprises a manually operated switch.

4. The assembly of claim 2 in which the actuator is a motor.

5. The assembly of claim 2 in which the actuator is a fluid cylinder.

6. The assembly of claim 1 in which the stairway has a plurality of steps and the panel has two upright side edges, a top edge and a bottom edge and in which the steps ascend along the panel beginning with a first step positioned adjacent to one side edge and the bottom edge, and ending with the top step positioned adjacent to the other side edge and the top edge, the first step and top step remaining at a fixed location relative to one another during movement of the stairway, and the top step comprising an elongated platform.

7. The assembly of claim 1 in which the door has a closed position and an open position and in which the assembly further comprises:
 at least one slide adapted to be coupled to one of the door and the stairway; and
 at least one substantially horizontal guide track adapted to be coupled to the other of the door and the stairway,
 the at least one slide being slidable within the at least one guide track as the door moves between the closed and open positions.

8. A vehicle including the stairway assembly according to claim 1.

9. A retractable stairway assembly for a vehicle having a cab, a door to the cab, and a side portion adjacent the cab, in which the vehicle side portion has a front quarter fender and a rear quarter fender and in which the front and rear quarter fenders define a wheel well, a wheel positioned in the wheel well, the assembly comprising:
 an upright panel having a front face and a back face, the panel of the assembly forming at least a portion of the rear quarter fender; and
 a stairway comprising a plurality of steps with step surfaces coupled to and projecting in a direction away from the back face of the panel;
 the stairway and panel being pivotally mounted to the vehicle so as to pivot about an upright stairway pivot axis for movement between a retracted position, in which the panel is substantially aligned with the side portion and the stairway is substantially behind the panel, with the step surfaces facing upwardly and at least one extended position, in which the stairway is exposed to allow ingress and egress from the cab; and
 the stairway having a top step which is elongated in the front to rear direction and which extends at least partially over the top of the wheel at least when the stairway is in the retracted position, and wherein the stairway pivot is positioned forwardly of the center of the wheel.

10. A retractable stairway assembly for a vehicle having a cab, a door to the cab, and a side portion adjacent the cab, the assembly comprising:
 a panel having a front face and a back face; and
 a stairway coupled to and projecting from the back face of the panel,
 the stairway and panel being movable between a retracted position, in which the panel is substantially aligned with the side portion and the stairway is behind the panel, and at least one extended position, in which the stairway is exposed to allow ingress and egress from the cab;
 the stairway having a plurality of steps, each of the plurality of steps having a step surface, and the panel having at least one foot receiving opening adjacent one of the step surfaces, through which at least a portion of the adjacent step surface is exposed, whereby a foot may be positioned through the at least one foot receiving opening to climb into the cab when the stairway and panel are in the retracted position.

11. The assembly of claim 10 having a plurality of foot receiving openings, each being positioned adjacent a respective one of the steps, each foot receiving opening being bounded along a lower portion by a panel step portion which is substantially horizontal and aligned with the adjacent step surface.

12. A retractable stairway assembly for a vehicle having a cab, a door for access to the cab, the door being movable between a closed position and an open position, and a side portion adjacent the cab with a front quarter fender and a rear quarter fender, the assembly comprsing:

a stairway having a plurality of steps and at least one side, the side of the stairway forming at least a portion of the rear quarter fender and being substantially aligned with the side portion when the stairway is in the retracted position, the stairway being pivotable from a retracted position about an upright axis into at least one extended position, in which the stairway is positioned to allow ingress to and egress from the cab;

a panel having a front face and a back face from which the steps project substantially perpendicularly outwardly so that when the stairway is in the retracted position, the steps are beneath the cab; and the stairway assembly further comprising an enlarged top step platform that projects outwardly from the front face of the panel so that the top step platform is positioned to be stepped on during ingress and egress from the cab when the steps are beneath the cab.

13. A cab for a vehicle comprising:

a cab body having at least one side portion with an opening;

a cab access door mounted to the side portion of the cab and pivotable between an open position and a closed position, in which the door covers the opening in the side portion;

a fender assembly adjacent the side portion of the cab body, the fender assembly including a front quarter fender and a rear quarter fender, each of the front and rear quarter fenders having an arcuately shaped edge that together define a wheel well;

the rear quarter fender also including:
  a panel having a front face and a back face; and
  a stairway with a plurality of steps projecting from the back face of the panel;

the rear quarter fender being pivotable about a vertical axis between a retracted position, in which the front face of the panel is substantially aligned with the front quarter fender and an extended position, in which the steps are exposed beyond the side portion of the cab body and are positioned to allow access to and from the cab.

14. The cab of claim 13 in which the steps each has a step surface and the rear quarter fender further comprises a plurality of step openings defined by the panel, each of the openings being adjacent a respective one of the step surfaces.

15. A retractable stairway assembly for a vehicle having a cab, a door to the cab, and a side portion adjacent the cab, the assembly comprising:

a stairway having a plurality of steps;

the stairway being coupled to the vehicle and being movable between a retracted position and at least one extended position, when in the extended position the stairway is at least partially exposed to allow ingress and egress from the cab;

a stairway position sensor mounted to the vehicle and adapted to detect and indicate the position of the stairway;

wherein the door is movable between opened and closed positions;

the assembly further comprising a door position sensor that detects the position of the door;

the assembly further comprising an alarm operatively connected to the stairway position sensor and the door position sensor;

wherein the alarm is activated when the door position sensor indicates that the door is open and the stairway position sensor indicates that the stairway is retracted; and including an occupant sensor operatively connected to the stairway and adapted to detect whether a person is occupying the stairway at least when movement of the stairway is attempted.

16. The assembly of claim 15, wherein the occupant sensor detects whether force applied to the stairway in a downward direction exceeds a predetermined value.

17. A retractable stairway assembly for a vehicle having a cab, a door to the cab, and a side portion adjacent the cab, the assembly comprising:

a stairway having a plurality of steps;

the stairway being coupled to the vehicle and being movable between a retracted position and at least one extended position, when in the extended position the stairway is at least partially exposed to allow ingress and egress from the cab;

a stairway position sensor mounted to the vehicle and adapted to detect and indicate the position of the stairway;

wherein the door is movable between opened and closed positions;

the assembly further comprising a door position sensor that detects the position of the door;

the assembly further comprising an alarm operatively connected to the stairway position sensor and the door position sensor;

wherein the alarm is activated when the door position sensor indicates that the door is open and the stairway position sensor indicates that the stairway is retracted; and including an obstacle sensor operatively connected to the stairway and adapted to detect obstacles to movement of the stairway.

18. The assembly of claim 17, wherein the obstacle sensor includes strain gauges.

19. A retractable stairway assembly for a vehicle having a cab, a door to the cab, and a side portion adjacent the cab, the assembly comprising:

an upright panel having a front face and a back face;

a stairway comprising a plurality of steps with step surfaces coupled to and projecting in a direction away from the back face of the panel;

the stairway and panel being movable between a retracted position, in which the panel is substantially aligned with the side portion and the stairway is behind the panel, with the step surfaces facing upwardly and at least one extended position, in which the stairway is exposed to allow ingress and egress from the cab;

including a first door position sensor and a second stairway position sensor and in which the assembly further comprises an alarm activated in response to the first and second sensors when the door is open and the stairway is in the retracted position; and including a deactivator operable to selectively deactivate the stairway, the stairway assembly including a detector operable to determine whether the deactivator has deactivated the stairway, the alarm being activated upon detection of deactivation of the stairway and the door being opened.

* * * * *

UNITED STATES PATENT AND TRADEMARK OFFICE
CERTIFICATE OF CORRECTION

| | |
|---|---|
| PATENT NO. | : 6,179,312 B1 |
| DATED | : January 30, 2001 |
| INVENTOR(S) | : Paschke et al. |

It is certified that error appears in the above-identified patent and that said Letters Patent is hereby corrected as shown below:

Title page,
Inventors, line 4, change "Ducan" to -- Duncan --

Column 1,
Line 23, change "wheel the" to -- wheel of the --.

Column 9,
Line 41, change "retraced" to -- retracted --.

Signed and Sealed this

Twenty-third Day of April, 2002

*Attest:*

JAMES E. ROGAN
*Attesting Officer*     *Director of the United States Patent and Trademark Office*